July 12, 1949.　　　　　H. SINCLAIR　　　　　2,475,679
POWER TRANSMISSION SYSTEM
Filed March 21, 1947
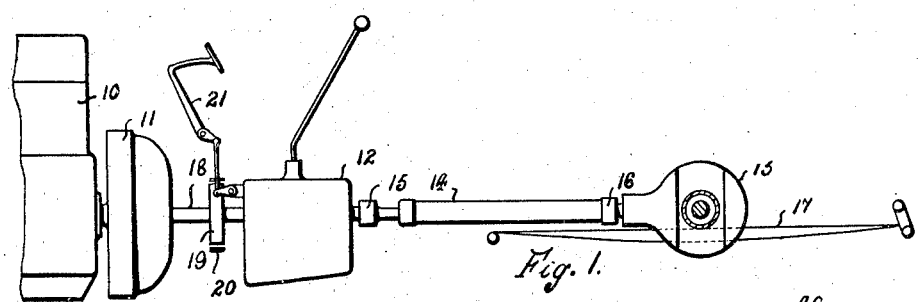
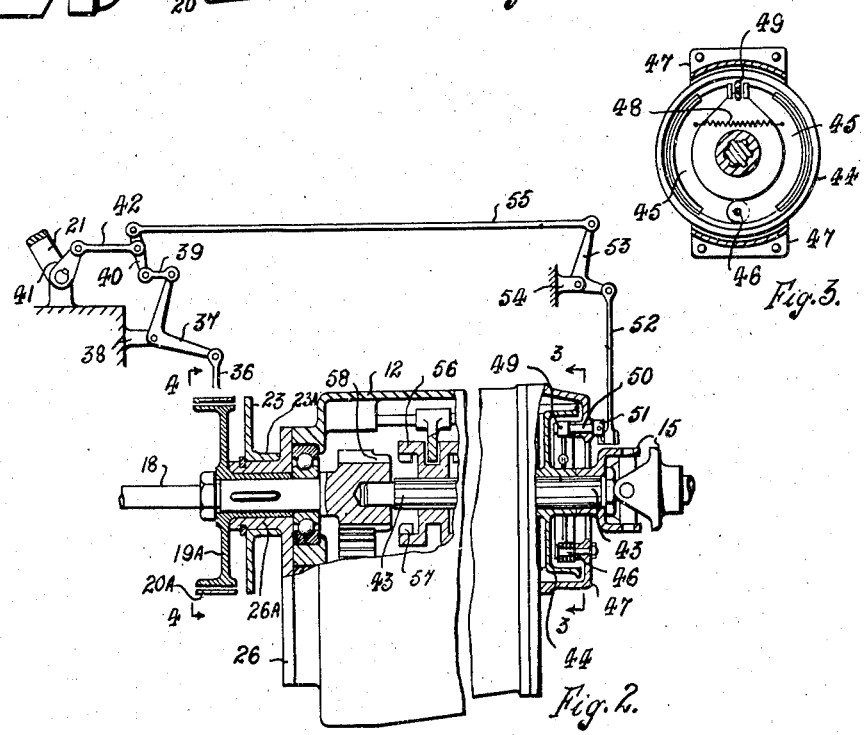
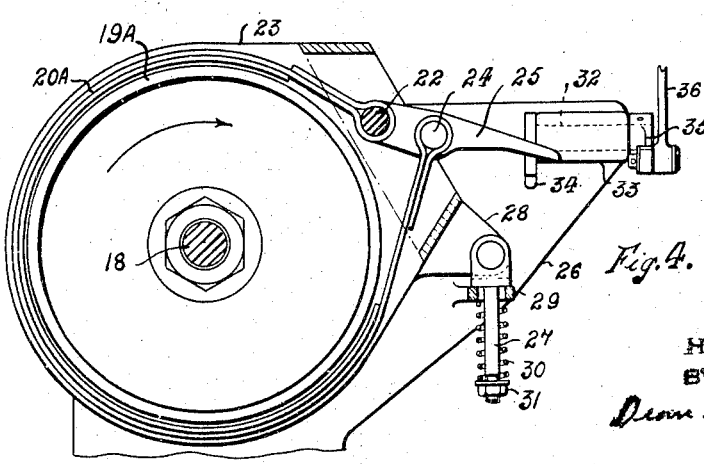
INVENTOR
Harold Sinclair
BY
ATTORNEY Patented July 12, 1949

2,475,679

UNITED STATES PATENT OFFICE 2,475,679

POWER-TRANSMISSION SYSTEM

Harold Sinclair, London, England

Application March 21, 1947, Serial No. 736,287
In Great Britain February 8, 1946

Section 1, Public Law 690, August 8, 1946
Patent expires February 8, 1966

4 Claims. (Cl. 74—732)

The present invention relates to power-transmission systems of the kind embodying a hydraulic coupling or torque-converter of the kinetic type between a driving motor and disconnecting means which can be actuated to interrupt the drive and which resist disengagement under torque load, the hydraulic transmitter being of the type, such as that working with a substantially constant liquid content, which does not completely interrupt the transmission of torque. The said disconnecting means may be for example jaw-clutches forming part of a multi-ratio gearing.

When such a transmission system is provided with a motor, such as an internal-combustion engine, which it is inconvenient to stop in order to engage and disengage the drive, the driven shaft of the system can be brought to rest, either by the load applied to it or by brakes, while the motor is still running and while the drive is engaged, the slip in the hydraulic transmitter being 100%. If in these circumstances it is desired to disconnect the drive, the torque transmitted by the hydraulic transmitter will be large enough, even if the motor is running at only idling speed, to load the drive-disconnecting means to such an extent as to prevent or hinder their disengagement. Accordingly it is usual to adopt the arrangement described in my Patent No. 1,978,172 which consists of a control member which, while the driving motor is running, while the disconnecting means are not disengaged, and while the driven part of the hydraulic transmitter has been arrested either by the load on the system or by separate braking means, can be operated to engage a part of the transmission system between the driven element of the hydraulic transmitter and the driving element of said disconnecting means and to impart to the said part a backward rotation sufficient to reduce suitably or eliminate the torque loading from said disconnecting means. Said control member is usually a back-turning friction brake which is operable first to engage the said part (so that it is usable as a clutch stop to enable the disconnecting means to be engaged) and secondly, after such engagement, and when necessary, to impart to the said part the said backward rotation.

When a transmission system of the kind hereinbefore referred to is used, for example, on a road motor vehicle, the drive-disconnecting means being the change-speed gearing, the portion of the transmission system between the gearing and the road wheels has appreciable torsional resilience; and, if the vehicle is brought to rest with the engine running and a gear engaged, the said portion of the system will be "wound up" by the idling drag torque of the engine, the extent to which it is wound up being the larger, the lower the speed ratio that is engaged.

A further variation arises in practice in the idling speed of the engine which directly affects the torsional "wind-up" of the shaft system. In consequence, if in such circumstances it is desired to change gear or to set the gear to neutral, the said back-turning friction brake (which usually operates on the input shaft of the change-speed gear), after engagement, has to be rotated backwards through a substantial angle, particularly when a low-speed gear is engaged, in order to "unwind" the said portion of the transmission system and thereby reduce suitably or eliminate the torque load from the gearing. This requirement involves the movement of the control mechanism of the back-turning brake through an inconveniently large travel. Furthermore, as the angle of back-turning may be different on different applications of for example a standard change-speed gear, the control mechanism of the back-turning friction brake cannot conveniently be standardised.

The object of this invention is to overcome these difficulties, and to reduce the work done in effecting the required degree of backward rotation.

In the accompanying diagrammatic drawings,

Fig. 1 shows the arrangement described in my said Patent No. 1,978,172, as applied to a road motor vehicle, Fig. 2 shows to a larger scale a part of the mechanism of Fig. 1 modified in accordance with the present invention, Fig. 3 is a section on the line 3—3 in Fig. 2, and Fig. 4 is a section to a still larger scale on the line 4—4 in Fig. 2.

In Fig. 1 an internal-combustion engine 10 is coupled by a hydraulic turbo-coupling 11 to a change-speed gear box 12 of the kind having jaw clutches or sliding-mesh gear wheels, or both, for enabling the different speed ratios to be selected. The gear box 12 drives a live axle 13 through a Cardan shaft 14 having universal joints 15 and 16. Reaction on the axle 13 due to driving or braking torque is taken up by the main axle suspension springs 17. The transmission shaft 18 between the turbo-coupling 11 and the gear box 12 is fitted with a brake drum 19 which cooperates with a band 20 of a back-turning friction brake controlled by a pedal 21.

If a vehicle fitted with the transmission system shown in Fig. 1 is brought to rest with the engine 10 running and a gear engaged in the gear box 12, the drag torque imposed on the system by the turbo-coupling 11 both torsionally strains the shafts of the system between the gear box 12 and the road wheels attached to the axle 13 and also causes the casing of the axle 13 to be rocked forwards and so strain the springs 17. Thus, even though the road wheels are held fast by the vehicle brakes, the shaft 18 will have to be rocked backwards by the brake 20 through a large angle in order to enable the torque load on the gear box to be relieved, particularly if a low-speed gear is engaged, in which case not only is the torque load on the parts of the transmission behind the gear box increased, but also the angle through which the shaft 18 must be turned to unload these parts is further increased by reason of the fact that the input shaft 18 of the gear box is now constrained to rotate farther than its output shaft.

A preferred arrangement in accordance with the present invention is shown in Fig. 2 and replaces the parts 19 and 20 of Fig. 1, the improved arrangement being otherwise as shown in Fig. 1.

The back-turning brake shown in Fig. 2 is of known design and provides only a small back-turning angle. It includes a drum 19A fast on the shaft 18 and co-operating with a contracting band 20A lined with friction composition (Fig. 4). One end of the band is anchored on a pin 22 fixed to a plate 23; the other end is anchored to a pin 24 on a lever 25 one end of which is pivoted on the pin 22. The plate 23 has a hub 23A rotatable on a hollow boss 26A projecting co-axially with the shaft 18 from a front cover 26 of the gear box 12. An eyebolt 27 is pivoted to an ear 28 projecting from the plate 23 and its stem passes through an eyelug 29 on the cover 26. A helical spring 30 compressed between the lug 29 and a nut 31 on the bolt normally holds the plate 23 in the position shown in Fig. 4, with the head of the bolt 27 abutting against the upper surface of the lug 29.

The brake-operating mechanism includes a transverse shaft 32 mounted in a bearing 33 on the cover 26 and rigid with a forwardly-projecting lever 34 adapted to engage the under side of the projecting end of the lever 25. A forwardly-projecting lever 35 fixed to the shaft 32 is connected by a link 36 to one arm of a bell-crank lever 37 mounted on a fixed pivot 38. The other arm of the bell-crank lever 37 is connected by a link 39 to one end of a differential lever 40. The pedal 21 is rigid with a lever 41 which is connected by a link 42 to a point on the lever 40 between its ends.

The output shaft 43 of the gear box is provided with a simple brake of conventional type having a drum 44 (Figs. 2 and 3) fast on the shaft 43 and co-operating with a pair of shoes 45 pivoted on a pin 46 fast in an anchorage bracket 47. A tension spring 48 normally keeps the shoes out of contact with the drum, and they can be moved apart to engage the drum by a cam 49 fast on a cam-shaft 50 rotatable in the bracket 47. A lever 51 fast on the cam-shaft 50 is connected by a link 52 to one arm of a bell-crank lever 53 carried by a fixed pivot 54. The other arm of the lever 53 is connected by a link 55 to the end of the differential lever 40 opposite to that to which the link 39 is connected.

In Fig. 2 the gear box 12 is partly in section to show, by way of example, a jaw clutch providing direct drive. A dog 56 splined to the output shaft 43 has clutch teeth 57 engageable with clutch teeth 58 on the input shaft 18. If the vehicle is brought to rest by the ordinary road-wheel brakes while the engine 10 is running and while the clutch 57 and 58 (or any other sliding-mesh teeth in the gear box) are engaged together, the drag torque transmitted by the turbo-coupling 11 will be large enough to hinder or prevent disengagement of the engaged teeth, e. g. in order to set the gear box to neutral or to engage another gear.

If now the pedal 21 is depressed, the brake-operating mechanism first acts to spread the shoes 45 of the simple brake into engagement with the drum 44 and also to raise the lever 25 of the back-turning brake and thereby contact the band 20A into engagement with the drum 19A. On continued depression of the pedal, since the band 20A is now fully contracted, the lever 25 cannot be raised farther relatively to the plate 23, and consequently the plate 23 and all the parts carried by it, together with the drum 19A, are caused to rotate backwards, i. e. in the direction opposite to that denoted by the arrow in Fig. 4, through a small angle, so that the spring 30 is further compressed. Since the shaft 43 is held stationary by the simple brake, a very small angular displacement of the shaft 18 by the back-turning brake is sufficient to unload the engaged teeth. The initial loading of the springs 30 and 48 is such that the plate 23 will not begin to turn backwards until the simple brake has been applied strongly enough to prevent any slipping of the drum 44 as the torque through the gear box is relieved.

The simple brake is exposed to very little wear: it is required to slip only after the disconnecting means have been disconnected, under the un-winding action of the torsionally resilient part of the transmission system as the brake is released. In consequence the simple brake may be arranged to have a very small clearance and to operate at an abnormally high specific contact pressure so that conveniently little work is required to engage it. A change-speed gearing, suitable for use, for example, in road motor vehicles as the drive disconnecting means of the improved transmission system, can therefore be provided with the said two brakes, co-operating with its input and output shafts respectively, together with the common control means for these brakes and any necessary inter-locking mechanism, all as a standard product, and suitable for use without modification on different vehicles where different degrees of transmission wind-up have to be catered for.

I claim:

1. A power-transmission system embodying a hydraulic power transmitter of the kinetic type between a driving motor and disconnecting means which can be actuated to interrupt the drive and which can resist disengagement under torque load, the hydraulic transmitter being of the type which does not completely interrupt the transmission of torque, the system also embodying a control member operable to engage a part of the transmission system between the hydraulic transmitter and the drive-disconnecting means, a control member operable to engage a part of the transmission system which is on the driven side of said disconnecting means and which is drivably connected to said disconnecting means by at least one element having no substantial torsional resilience, and an actuating member operable for imparting to at least one of the said two control members, after they have been engaged with the system, a relative rotation with respect to each other in such a direction as to at least suitably reduce the driving torque loading on said connecting means.

2. A power-transmission system embodying a hydraulic power transmitter of the kinetic type between a driving motor and disconnecting means which can be actuated to interrupt the drive and which resist disengagement under torque load, the hydraulic transmitter being of the type which does not completely interrupt the transmission of torque, the system also embodying a back-turning friction brake engageable with a part of the transmission system between the hydraulic transmitter and the drive disconnecting means, a simple brake engageable with a part of the transmission system which is on the driven side of said disconnecting means and which is drivably connected to said disconnecting means by at least one element having no substantial torsional resilience, and an actuating member common to the said two brakes and operable firstly to engage both of said brakes and thereafter to impart a backward rotation to said back-turning brake.

3. A power-transmission system embodying a hydraulic power transmitter of the kinetic type between a driving motor and disconnecting means which can be actuated to interrupt the drive and which resist disengagement under torque load, the hydraulic transmitter being of the type which does not completely interrupt the transmission of torque, the system also embodying a back-turning friction brake engageable with a part of the transmission system between the hydraulic transmitter and the drive disconnecting means, a simple brake engageable with a part of the transmission system which is on the driven side of said disconnecting means and which is drivably connected to said disconnecting means by at least one element having no substantial torsional resilience, and an actuating member operatively connected to the said two brakes by a differential mechanism so that, when both of said brakes are engaged, further movement of the actuating member imparts backward rotation to said back-turning brake.

4. A power-transmission system for an automotive vehicle and including, connected in the order named between an internal-combustion motor and running wheels of the vehicle, a hydraulic power transmitter of the kinetic type, a change-speed gearing having an input shaft and an output shaft and gear-selecting means which resist disengagement when under torque load, and at least one transmission element having appreciable torsional resilience, the system also including a back-turning friction brake associated with said input shaft, characterised by a simple brake associated with said output shaft, and a common actuating member operable first to engage both of said brakes and thereafter to impart backward rotation to said back-turning brake.

HAROLD SINCLAIR.

REFERENCES CITED

The following references are of record in the file of this patent:

UNITED STATES PATENTS

| Number | Name | Date |
|---|---|---|
| 1,403,819 | Stowers et al. | Jan. 17, 1922 |
| 2,309,051 | Dodge | Jan. 19, 1943 |
| 2,373,234 | Duffield | Apr. 10, 1945 |
| 2,410,333 | Barkeij | Oct. 29, 1946 |